United States Patent [19]
Ji et al.

[11] Patent Number: 5,579,179
[45] Date of Patent: Nov. 26, 1996

[54] METHOD FOR MANUFACTURING AN ARRAY OF THIN FILM ACTUATED MIRRORS

[75] Inventors: Jeong-Beom Ji; Young-Jun Choi, both of Seoul, Rep. of Korea

[73] Assignee: Daewoo Electronics Co., Ltd.

[21] Appl. No.: 470,411

[22] Filed: Jun. 6, 1995

[30] Foreign Application Priority Data

Jun. 22, 1994 [KR] Rep. of Korea ...................... 94-14156
Jun. 30, 1994 [KR] Rep. of Korea ...................... 94-15347

[51] Int. Cl.⁶ .................................................. G02B 26/00
[52] U.S. Cl. .......................... 359/846; 359/224; 359/291; 359/900; 29/25.35; 310/328; 310/366
[58] Field of Search .............................. 310/328, 366; 29/25.35; 359/224, 225, 291, 295, 900, 290, 297, 846

[56] References Cited

U.S. PATENT DOCUMENTS

| 5,159,225 | 10/1992 | Um | 310/328 |
| 5,469,302 | 11/1995 | Lim | 359/846 |
| 5,505,807 | 4/1996 | Min et al. | 156/230 |
| 5,506,720 | 4/1996 | Yoon | 359/224 |

*Primary Examiner*—Timothy P. Callahan
*Assistant Examiner*—Eunja Shin
*Attorney, Agent, or Firm*—Pennie & Edmonds

[57] ABSTRACT

An improved method for manufacturing an array of M×N thin film actuated mirrors comprises the steps of: providing a base having a flat top surface; forming sequentially a separation layer, a first thin film layer, and a thin film electrodisplacive layer on the top surface of the base; heat treating the thin film electrodisplacive layer to allow a phase transition to take place; forming sequentially a second thin film layer, a elastic layer, and a thin film sacrificial layer on top of the thin film electrodisplacive layer; forming an array of M×N empty slots to the sacrificial layer; forming a supporting layer on top of the sacrificial layer; forming an array of M×N conduits, each of the conduits passing through the supporting layer and each of the empty slots to thereby form a multilayer structure; forming an array of M×N transistors on top of the multilayer structure to thereby form a semifinished actuated mirror structure; attaching an active matrix to the semifinished actuated mirror structure; separating the base from the semifinished actuated mirror structure by removing the separation layer to thereby form an actuated mirror structure; patterning the actuated mirror structure into an array of M×N semifinished actuated mirrors; and removing the thin film sacrificial layer to thereby form the array of M×N thin film actuated mirrors.

13 Claims, 6 Drawing Sheets

METHOD FOR MANUFACTURING AN ARRAY OF THIN FILM ACTUATED MIRRORS

FIELD OF THE INVENTION

The present invention relates to an optical projection system; and, more particularly, to an improved method for manufacturing an array of M×N thin film actuated mirrors for use in the system.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1 and 2A to 2F, there are shown cross sectional views illustrating an array 10 of M×N thin film actuated mirrors 11 for use in an optical projection system, wherein M and N are integers, and cross sectional views setting forth a method for manufacturing same, disclosed in a copending commonly owned application, U.S. Ser. No. 08/331,399, entitled "THIN FILM ACTUATED MIRROR ARRAY AND METHOD FOR THE MANUFACTURE THEREOF".

The array 10 of M×N thin film actuated mirrors 11 shown in FIG. 1 comprises an array 13 of actuating structures 14, an array 17 of M×N mirrors 18, an active matrix 12, and an array 15 of M×N supporting members 16.

As illustrated in FIG. 2A, the process for manufacturing the array 10 of M×N thin film actuated mirrors 11 begins with the preparation of the active matrix 12, having a top and a bottom surfaces 75, 76, comprising a substrate 59, an array of M×N transistors (not shown), a conduction line pattern (not shown) and an array 60 of M×N connecting terminals 61.

In a subsequent step, there is formed on the top surface 75 of the active matrix 12 a supporting layer 80, including an array 81 of M×N pedestals 82 corresponding to the array 15 of M×N supporting members 16 and a sacrificial area 83, wherein the supporting layer 80 is formed by: depositing a thin film sacrificial layer(not shown) on the entirety of the top surface 75 of the active matrix 12; forming an array of M×N empty slots (not shown), to thereby generate the sacrificial area 83, each of the empty slots being located around each of the M×N connecting terminals 61; and providing a pedestal 82 in each of the empty slots, as shown in FIG. 2B. The thin film sacrificial layer is formed by using a sputtering method; the array of empty slots, using an etching method; and the pedestals, using a sputtering or a chemical vapor deposition(CVD) method, followed by an etching method. The sacrificial area 83 of the supporting layer 80 is then treated for its subsequent removal using, e.g., an etching method.

A conduit 73 is formed in each of the pedestals 82 by first creating a hole extending from top thereof to top of the corresponding connecting terminals 61 using an etching method, followed by filling therein with an electrically conductive material, as depicted in FIG. 2C.

In the subsequent step, as depicted in FIG. 2D, a first thin film electrode layer 84, made of an electrically conductive material, e.g., Pt, is deposited on the supporting layer 80. Thereafter, a thin film electrodisplacive layer 85, made of an electrodisplacive material, e.g., PZT, is formed on top of the first thin film electrode layer 84. The structure is then heat treated at a temperature ranging from 600° C. to 800° C. to allow a phase transition to take place in the thin film electrodisplacive layer 85. Once the phase transition has taken place, a second thin film electrode layer 95, made of an electrically conductive material, is deposited on top of the thin film electrodisplacive layer 85.

Subsequently, a thin film layer 99, made of a light reflecting material, e.g., Al, is provided on top of the second electrode layer 95.

The thin film layers of the electrically conductive, the electrodisplacive, and the light reflecting materials may be deposited and patterned with the known thin film techniques, such as sputtering, Sol-Gel, evaporation, etching and micromachining, as shown in FIG. 2E.

The sacrificial area 83 of the supporting layer 80 is then removed or dissolved by the application of chemicals, e.g., fluoric acid, to thereby form said array 10 of M×N thin film actuated mirrors 11, as illustrated in FIG. 2F.

There are a number of problems associated with the above described method for manufacturing the array 10 of M×N thin film actuated mirrors 11. The first and foremost one is the degradation of the transistors and the conduction line pattern in the active matrix 12 during the formation of the supporting members 16 and the thin film electrodisplacive layer 85, caused by a high temperature required.

SUMMARY OF THE INVENTION

It is, therefore, a primary object of the present invention to provide a method for manufacturing an array of M×N thin film actuated mirrors for use in an optical projection system, the method capable of minimizing the degradation of the transistors and the conduction line pattern in the active matrix.

In accordance with one aspect of the present invention, there is provided an improved method for manufacturing an array of M×N thin film actuated mirrors for use in an optical projection system, said method comprising the steps of: (a) providing a base having a top surface; (b) forming a separation layer on the top surface of the base; (c) depositing a first thin film layer, made of an electrically conductive and light reflecting material, capable of functioning as a mirror as well as a bias electrode in the thin film actuated mirrors, on top of the separation layer; (d) forming a thin film electrodisplacive layer on top of the first thin film layer; (e) heat treating the thin film electrodisplacive layer to allow a phase transition thereof to take place; (f) depositing a second thin film layer, made of an electrically conductive material, capable of functioning as a signal electrode in the thin film actuated mirrors, on top of the thin film electrodisplacive layer; (g) forming an elastic layer, made of an insulating material, on top of the second thin film layer; (h) constructing a thin film sacrificial layer on top of the elastic layer; (i) establishing an array of M×N empty slots by removing portions of the sacrificial layer, each of the empty slots extending from top of the sacrificial layer to top of the elastic layer; (j) building a supporting layer, made of a poly-silicon, on top of the sacrificial layer, wherein each of the empty slots is also filled with the poly-silicon; (k) structuring an array of M×N conduits, each of the conduits extending from top of the supporting layer to top of the second thin film layer, each of the conduits passing through each of the empty slots to thereby form a multilayer structure; (l) making an array of M×N transistors on top of the multilayer structure, each of the transistors being electrically connected to each of the conduits through a conduction line pattern to thereby form a semifinished actuated mirror structure; (m) attaching an active matrix to the semifinished actuated mirror structure; (n) separating the base from the semifinished actuated mirror structure by removing the separation layer to thereby form an actuated mirror structure; (o) patterning the actuated mirror structure into an array of M×N semifinished actuated mirrors; and (p) removing the thin film sacrificial layer in each of the semifinished actuated mirrors to thereby form the array of M×N thin film actuated mirrors.

BRIEF DESCRIPTION OF THE DRAWINGS

The above and other objects and features of the present invention will become apparent from the following description of preferred embodiments given in conjunction with the accompanying drawings, wherein.

DETAILED DESCRIPTION OF THE PREFERRED EMBODIMENTS

The process for manufacturing the array 100 begins with the preparation of a base 110, made of an insulating material, e.g., glass, and having a flat top surface.

Figure 1:
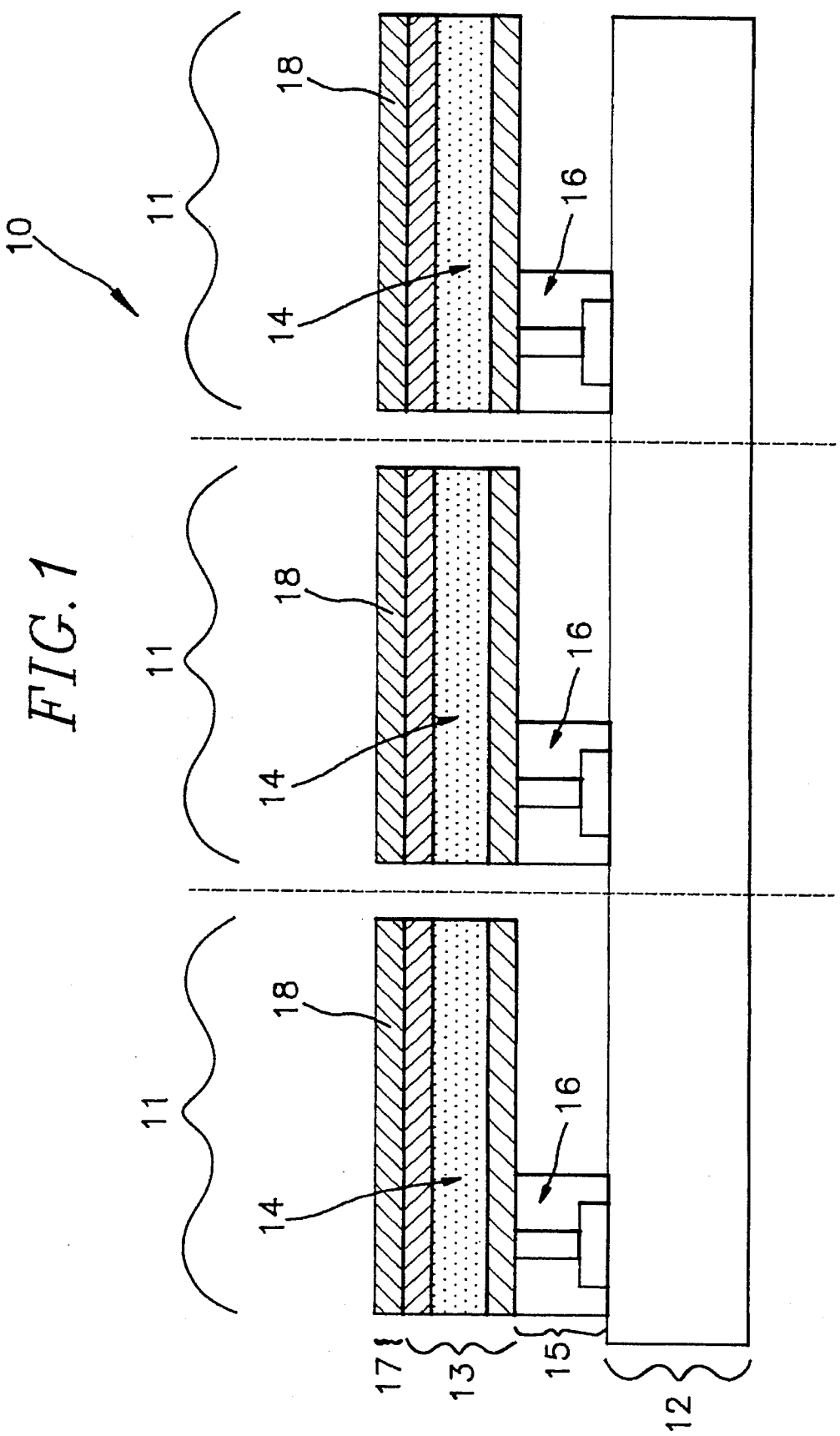
FIG. 1 shows a cross sectional view of an array of M×N thin film actuated mirrors previously disclosed.
Figure 2A:
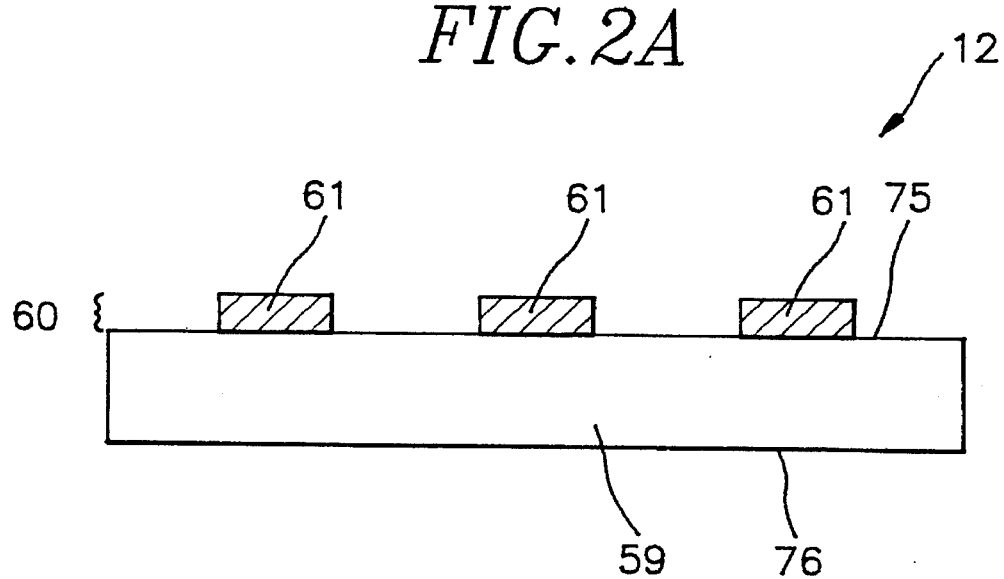
FIGS. 2A to 2F illustrate schematic cross sectional views setting forth the manufacturing steps for the array shown in FIG. 1.
Figure 2B:
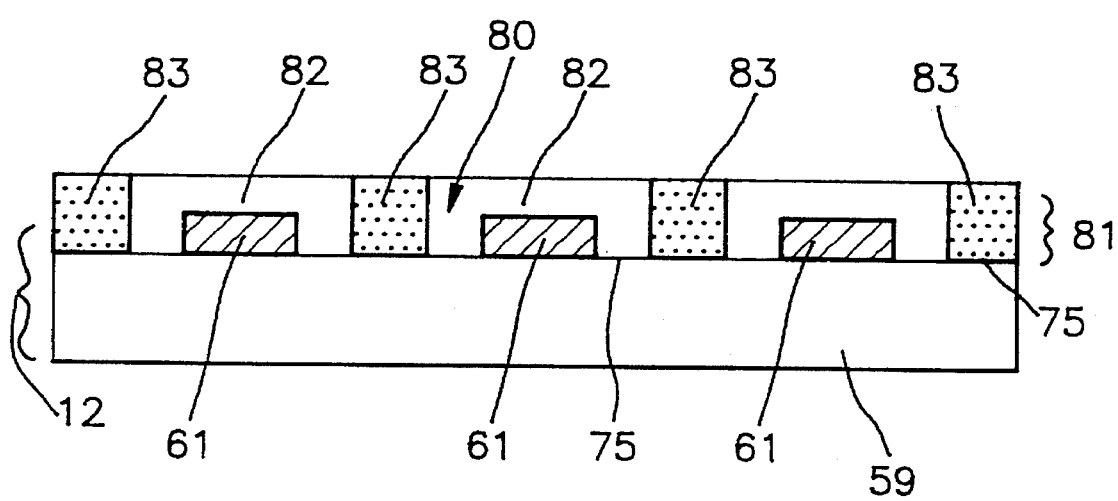
Figure 2C:
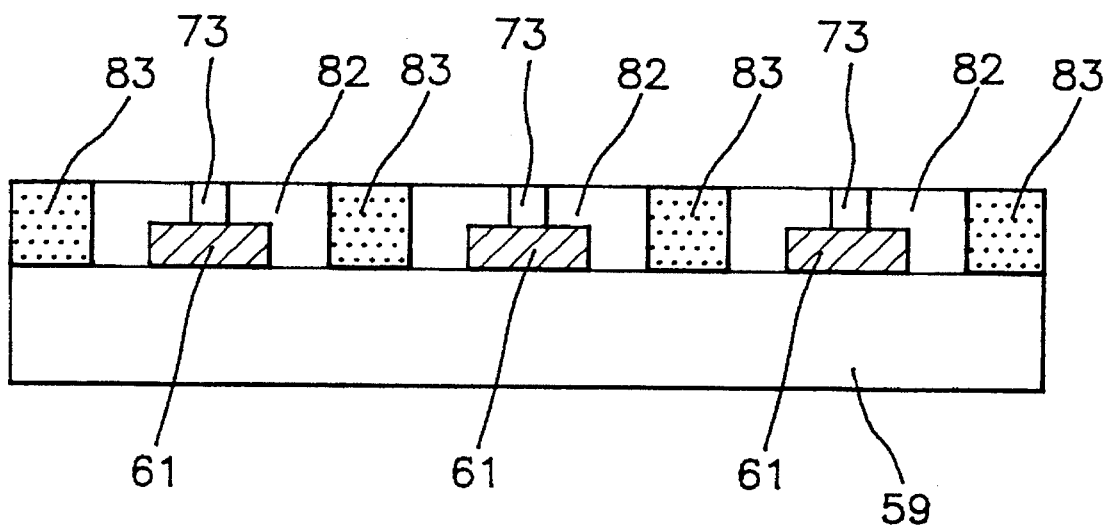
Figure 2D:
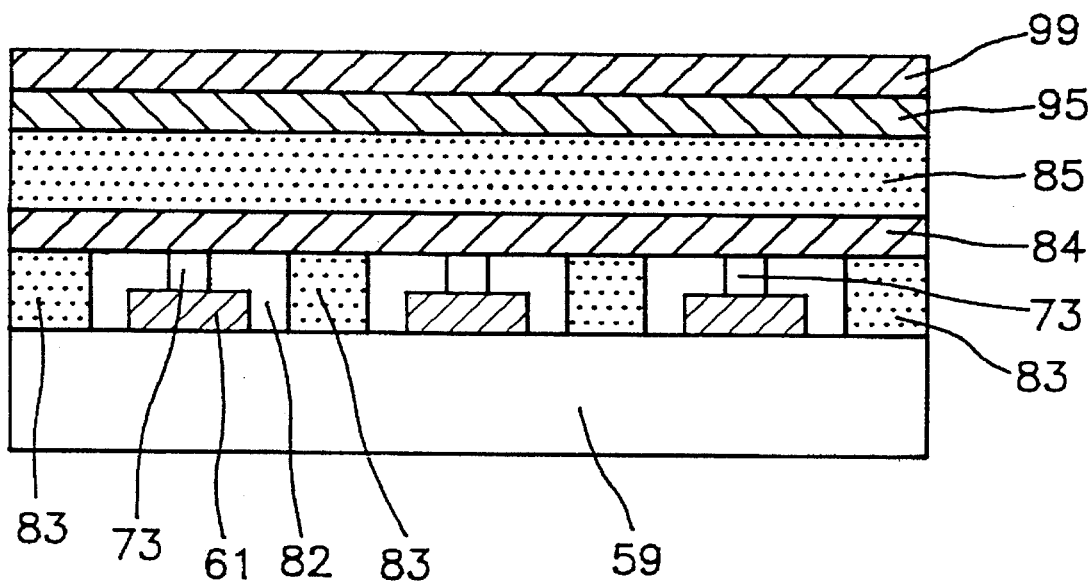
Figure 2E:
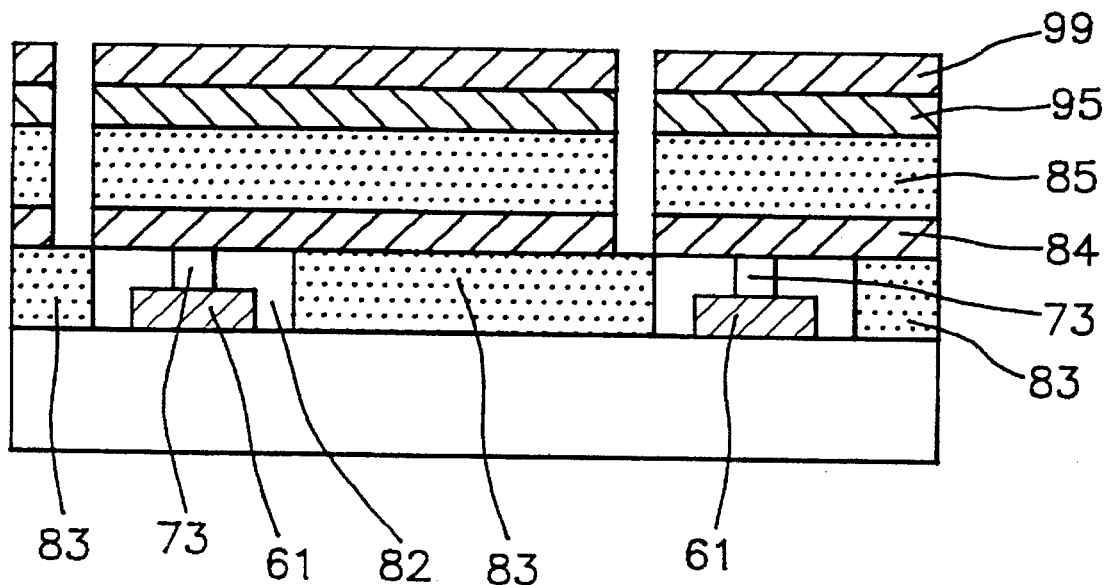
Figure 2F:
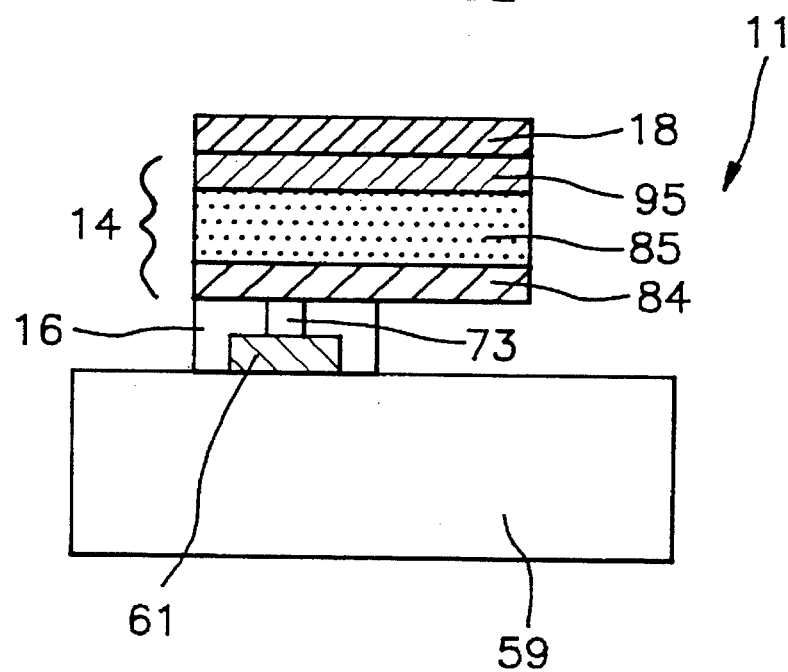
Figure 3A:
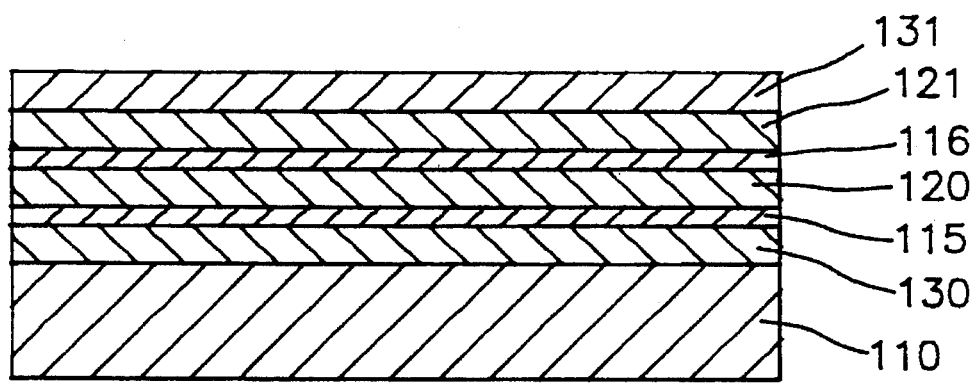
FIGS. 3A to 3D provide schematic cross sectional views explaining the inventive method for manufacturing an array of M×N thin film actuated mirrors.

In the first step, as shown in FIG. 3A, a separation layer 130, a first thin film layer 115, a thin film electrodisplacive layer 120, a second thin film layer 116, an elastic layer 121 and a thin film sacrificial layer 131 are sequentially formed on the top surface of the base 110. The separation layer 130, made of an water soluble material, e.g., NaCl, and having a thickness of 1000 Å to 3000 Å, is formed on the top surface of the base 110 by using a sputtering or a vacuum evaporation method. The first thin film layer 115, made of an electrically conducting and light reflecting material, e.g., platinum(Pt), capable of functioning as a mirror as well as a bias electrode in the thin film actuated mirrors 101, and having a thickness of 500–2000 Å, is formed on top of the separation layer 130 by using a sputtering or a vacuum evaporation method. The thin film electrodisplacive layer 120, made of a piezoelectric material, e.g., lead zirconium titanate(PZT), or an electrostrictive material, e.g., lead magnesium niobate(PMN), and having a thickness of 0.7–2 μm, is formed on top of the first thin film layer 115 by using a Sol-Gel method or a sputtering method and then is heat treated to allow a phase transition thereof to take place. Since the thin film electrodisplacive layer 120 is sufficiently thin, there is no need to pole it in case it is made of a piezoelectric material: for it can be poled with the electrical signal applied during the operation of the actuated mirrors 101. The second thin film layer 116, made of an electrically conducting material, e.g., platinum(Pt) or platinum/titanium(Pt/Ti), capable of functioning as a signal electrode in the thin film actuated mirrors(101), and having a thickness of 0.7–2 μm, is formed on top of the thin film electrodisplacive layer 120 by using a sputtering or a vacuum evaporation method. The elastic layer 121, made of an insulating material, e.g., silicon nitride($Si_3N_4$), and having a thickness of 500–2000 Å, is formed on top of the second thin film layer 116 by using a Sol-Gel method, a sputtering method or a chemical vapor deposition(CVD) method. The thin film sacrificial layer 131, made of a metal, e.g., copper(Cu) or nickel(Ni), or a phosphor-silicate glass(PSG) or a polysilicon, and having a thickness of 1–2 μm, is formed on top of the elastic layer 121 by using a sputtering method if the thin film sacrificial layer 131 is made of a metal, a chemical vapor deposition(CVD) method or a spin coating method if the thin film sacrificial layer 131 is made of a PSG, and a CVD method if the thin film sacrificial layer 131 is made of a poly-silicon.

Figure 3B:
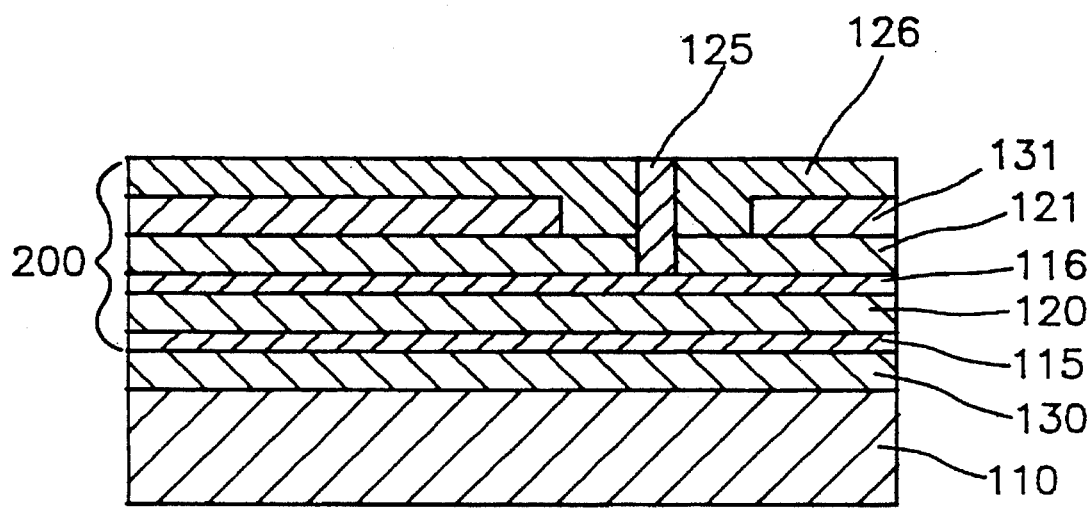

In the subsequent step, an array of M×N empty slots(not shown) is formed in the thin film sacrificial layer 131 by using a photolithography method, wherein each of the slots extends from top thereof to top of the elastic layer(121). A supporting layer 126, made of an insulating material, e.g., silicon nitride($Si_3N_4$), is formed on top of the thin film sacrificial layer 131 by using a sputtering method or a CVD method, wherein each of the empty slots is also filled with the poly-silicon. Thereafter, an array of M×N conduits 125, made of a metal, e.g., aluminum(Al), each of the conduits 125 being capable of providing an electric signal to the second thin film layer 116 in each of the actuated mirrors 101, is formed by: first creating M×N holes(not shown), each of the holes extending from top of the supporting layer 126 to top of the second thin film layer 116 and passing through each of the empty slots, by using an etching method; and filling therein with the metal by using a sputtering method, to thereby form a multilayer structure 200, as depicted in FIG. 3B.

Figure 3C:
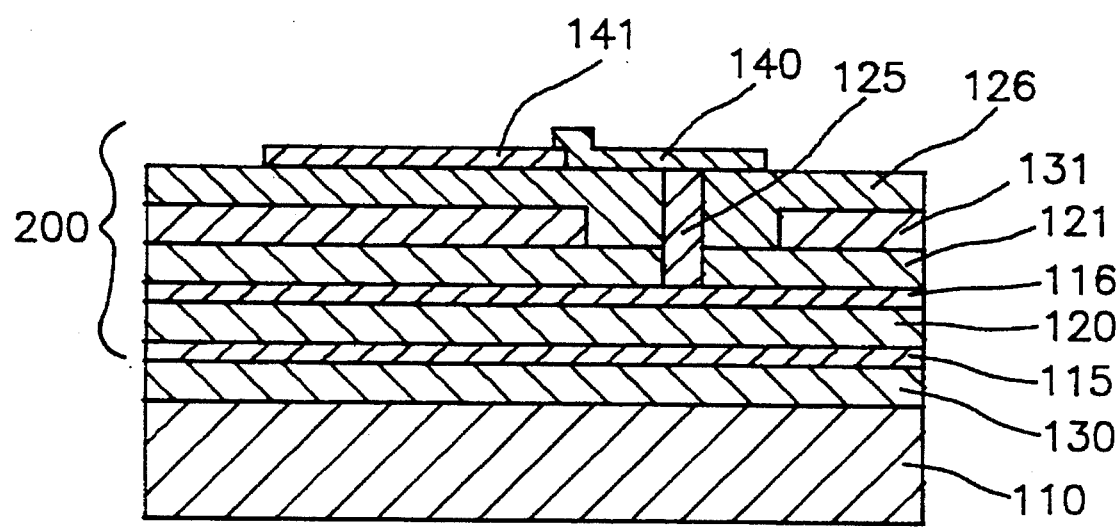

Thereafter, an array of M×N transistors 140, made of a semiconductor, e.g., metal oxide semiconductor(MOS), is formed on top of the multilayer structure 200. Each of the transistors 140 is connected electrically to each of the conduits 125 through a conduction line pattern 141, made of a metal, e.g., copper(Cu), to thereby form a semifinished actuated mirror structure 210, as shown in FIG. 3C. Each of the transistors 140 can be directly connected electrically to each of the conduits 125.

In the ensuing step, an active matrix 111, made of a ceramic, is attached to the semifinished actuated mirror structure 210 by using an adhesive 145 made of a metal having a low melting point and a low contraction ratio, e.g., indium(In), tin(Sn). The separation layer 130 is removed by using a wet etching method, to thereby separate the base 110 from the semifinished actuated mirror structure 210 to form an actuated mirror structure(not shown). Thereafter, the actuated mirror structure is patterned into an array of M×N semifinished actuated mirrors(not shown) by using a photolithography method or a laser trimming method.

Figure 3D:
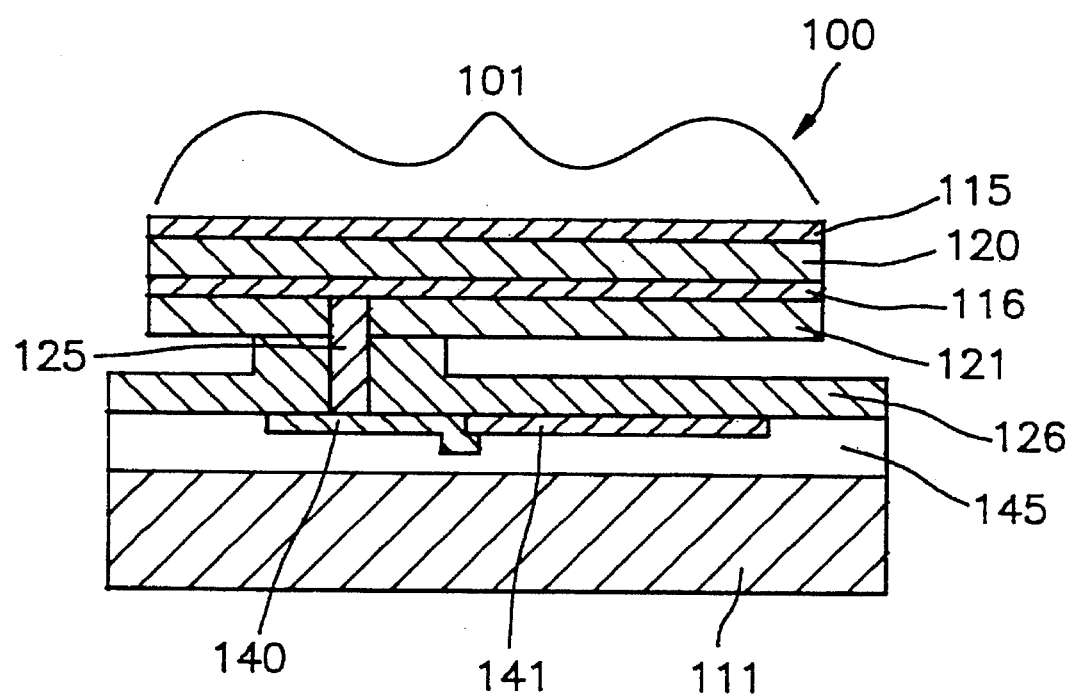

The thin film sacrificial layer 131 in each of the semifinished actuated mirrors is then removed by using an etching method to thereby form the array 100 of M×N thin film actuated mirrors 101, as shown in FIG. 3D.

In contrast with the method for forming the array of M×N thin film actuated mirrors disclosed previously, wherein the heat treatment for forcing the phase transition of the electrodisplacive material constituting the electrodisplacive layer 85 to occur after the active matrix 12 has been attached, in the inventive method, the heat treatment takes place prior to the forming of the transistors 140 and the conduction line pattern 141, thereby preventing the degradation of the transistors 140 and the conduction line pattern 141 due to the heat.

While the present invention has been described with respect to certain preferred embodiments only, other modifications and variations may be made without departing from the scope of the present invention as set forth in the following claims.

What is claimed is:

1. A method for manufacturing an array of M×N thin film actuated mirrors for use in an optical projection system, the method comprising the steps of:

(a) providing a base having a top surface;

(b) forming a separation layer on the top surface of the base;

(c) depositing a first thin film layer, made of an electrically conductive and light reflecting material, capable of functioning as a mirror as well as a bias electrode in the thin film actuated mirrors, on top of the separation layer;

(d) forming a thin film electrodisplacive layer on top of the first thin film layer;

(e) heat treating the thin film electrodisplacive layer to allow a phase transition thereof to take place;

(f) depositing a second thin film layer, made of an electrically conductive material, capable of functioning as a signal electrode in the thin film actuated mirrors, on top of the thin film electrodisplacive layer;

(g) forming an elastic layer, made of an insulating material, on top of the second thin film layer;

(h) forming a thin film sacrificial layer on top of the elastic layer;

(i) forming an array of M×N empty slots by removing portions of the sacrificial layer, each of the empty slots extending from top of the sacrificial layer to top of the elastic layer;

(j) forming a supporting layer, made of a poly-silicon, on top of the sacrificial layer, wherein each of the empty slots is also filled with the poly-silicon;

(k) forming an array of M×N conduits, each of the conduits extending from top of the supporting layer to top of the second thin film layer, each of the conduits passing through each of the empty slots to thereby form a multilayer structure;

(l) forming an array of M×N transistors on top of the multilayer structure, each of the transistors being electrically connected to each of the conduits through a conduction line pattern to thereby form a semifinished actuated mirror structure;

(m) attaching an active matrix to the semifinished actuated mirror structure;

(n) separating the base from the semifinished actuated mirror structure by removing the separation layer to thereby form an actuated mirror structure;

(o) patterning the actuated mirror structure into an array of M×N semifinished actuated mirrors; and (p) removing the thin film sacrificial layer in each of the semifinished actuated mirrors to thereby form the array of M×N thin film actuated mirrors.

2. The method of claim 1, wherein the separation layer is made of a water soluble material.

3. The method of claim 1, wherein the separation layer is formed by using a sputtering or a vacuum evaporation method.

4. The method of claim 1, wherein the separation layer is removed by using a wet etching method.

5. The method of claim 1, wherein the thin film electrodisplacive layer is made of a piezoelectric or an electrostrictive material.

6. The method of claim 5, wherein the thin film electrodisplacive layer is formed by using a Sol-Gel or a sputtering method.

7. The method of claim 1, wherein the first and the second thin film layers are formed by using a sputtering or a vacuum evaporation method.

8. The method of claim 1, wherein the elastic layer is formed by using a Sol-Gel, a sputtering or a CVD method.

9. The method of claim 1, wherein the thin film sacrificial layer is formed by using a sputtering method if the thin film sacrificial layer is made of a metal; a chemical vapor deposition method or a spin coating method if the thin film sacrificial layer is made of a phosphor-silicate glass; or a chemical vapor deposition method if the thin film sacrificial layer is made of a poly-silicon.

10. The method of claim 1, wherein the conduits are formed by using an etching method, followed by a sputtering method.

11. The method of claim 1, wherein the actuated mirror structure is patterned by using a photolithography or a laser trimming method.

12. The method of claim 1, wherein the thin film sacrificial layer is removed by using an etching method.

13. The method of claim 1, wherein each of the transistors is directly connected electrically to each of the conduits.

* * * * *